United States Patent [19]

Tateoka et al.

[11] Patent Number: 4,514,626

[45] Date of Patent: Apr. 30, 1985

[54] APPARATUS FOR READING AN ORIGINAL SURFACE BY ILLUMINATING IT WITH A SLIT-LIKE BEAM

[75] Inventors: Masamichi Tateoka, Tokyo; Yukihiko Ogata, Kawasaki, both of Japan

[73] Assignee: Canon Kabushiki Kaisha, Tokyo, Japan

[21] Appl. No.: 330,722

[22] Filed: Dec. 14, 1981

[30] Foreign Application Priority Data

Dec. 22, 1980 [JP] Japan ................................. 55-182465

[51] Int. Cl.³ .............................................. H01J 5/16
[52] U.S. Cl. ..................................... 250/235; 358/293
[58] Field of Search ....................... 358/293, 204, 206; 250/216, 234, 235, 572; 355/8, 11, 51, 52, 65, 66; 350/6.3

[56] References Cited

U.S. PATENT DOCUMENTS

| 2,989,586 | 6/1961 | Beck et al. | 358/293 |
| 4,245,259 | 1/1981 | Pick | 358/293 |
| 4,321,627 | 3/1982 | Hooker, III et al. | 358/293 |
| 4,327,287 | 4/1982 | Saito et al. | 250/234 |

Primary Examiner—David C. Nelms
Assistant Examiner—J. Jon Brophy
Attorney, Agent, or Firm—Fitzpatrick, Cella, Harper & Scinto

[57] ABSTRACT

An apparatus for reading an original surface by illuminating it with a slit-like light beam includes a fixed linear light source, a cylindrical parabolic mirror fixedly provided so that the focal line position thereof is coincident with the linear light source, the light beam from the linear light source being directed in a predetermined direction by the parabolic mirror, a cylindrical scanning mirror disposed so that the generating line direction thereof is coincident with the generating line direction of the cylindrical parabolic mirror, the cylindrical scanning mirror condensing the light beam from the cylindrical parabolic mirror in a slit-like form on the original surface and being moved along the original surface to thereby illuminate the entire area of the original surface, and an optical system movable with the cylindrical scanning mirror to read the light beam scattered by the original surface, the optical system includes a line sensor array and optical means for directing the scattered light to the line sensor array.

8 Claims, 6 Drawing Figures

APPARATUS FOR READING AN ORIGINAL SURFACE BY ILLUMINATING IT WITH A SLIT-LIKE BEAM

BACKGROUND OF THE INVENTION

1. Field of the Invention

This invention relates to a compact reading apparatus for use for the reading of a facsimile apparatus or the like.

2. Description of the Prior Art

As one of the reading systems for a facsimile apparatus or the like, there is a system in which an original is intermittently moved in a secondary scanning direction, namely, in the direction of the shorter side of a slit, and a reading scanning head having a solid state image pick-up element such as CCD having the array direction thereof set in parallelism to the secondary scanning direction is reciprocated in a primary scanning direction, namely, in the lengthwise direction of the slit orthogonal to the secondary scanning direction, whereby an original image is read for each of a plurality of lines corresponding to the number of arrays of the solid state image pick-up element.

The illuminating system in such reading apparatus must effect, for example, illumination of ⅛ mm at GIII of CCITT standard and 1/6 mm at GII in the primary scanning direction and illumination of a length corresponding to the number of arrays of the solid state image pick-up element in the secondary scanning direction, namely, linear illumination elongated in the secondary scanning direction.

An apparatus disclosed in Japanese Laid-open Patent Application No. 74621/1979 is known as such reading apparatus, and this reading apparatus is shown in FIG. 1 of the accompanying drawings. In FIG. 1, reference numeral 1 designates an original which is intermittently fed in the direction of arrow 2 (secondary scanning direction). Reference characters 3a and 3b denote rod-like illuminating light sources which illuminate the slit width areas 6a-6b of the original 1, and an image element of the slit width areas 6a-6b is projected upon a solid state image pick-up element 5 arranged in the secondary scanning direction by an imaging lens 4.

The illuminating light sources 3a, 3b, the imaging lens 4 and the solid state image pick-up element 5 together constitute a reading head 7 which is reciprocated in the direction of arrow 8 (primary scanning direction). Thus, by one reciprocal movement of the reading head 7, reading-scanning of a plurality of lines is accomplished at the same time.

However, this apparatus has suffered from a problem that movement of the light sources 3a and 3b reduces the life thereof and unless the light sources are firmly fixed to the reading head, the positions of the light sources become deviated during movement of the reading head, thus resulting in irregular illumination.

To overcome such disadvantage, a reading apparatus in which the light source is fixed as shown in FIG. 2 of the accompanying drawings has heretofore been proposed. In FIG. 2, the original 1 is intermittently fed in the direction of arrow 2 (secondary scanning direction). Reference numeral 9 designates an illuminating light source such as a fluorescent lamp fixedly provided to effectively illuminate the entire lengthwise area of the slit, and reference numeral 10 denotes a fixed reflecting mirror for illuminating the entire area of the slit width areas 6a-6b of the original 1 in the primary scanning direction. An image element of the slit width areas 6a-6b of the original 1 in the primary scanning direction is projected upon a solid state image pick-up element 5 set in the secondary scanning direction, by an imaging lens 4. The imaging lens 4 and the solid state image pick-up element 5 together constitute a reading head 11 which is reciprocated in the direction of arrow 8 (primary scanning direction). However in the reading apparatus shown in FIGS. 1 and 2, the illuminating light source always illuminates the entire area of the slit width areas 6a-6b in the primary scanning direction and therefore, the light of the light source is not efficientl utilized and irregular illumination occurs in the array direction of the solid state image pick-up element.

Further, U.S. Pat. No. Re 29,017 discloses an optical system in which a point source of light is fixed an illuminating light beam is made into a substantially rectangular parralel light beam in a cross-section perpendicular to the optical axis and finally linear illumination is effected.

In this system, the light source is fixed to thereby prevent reduced life thereof, but in order to obtain an illuminating light source having a substantially rectangular cross-section, it has been necessary to use a mirror of complicated configuration called a parabolic mirror having a refractive power in two directions in a cross-section perpendicular to the optical axis.

SUMMARY OF THE INVENTION

It is an object of the present invention to provide a reading apparatus provided with an illuminating optical system which can illuminate an original surface efficiently and without irregularity of illumination with a light for illuminating the original being fixed and which can structurally be readily realized. This illuminating optical system is particularly suitable for a reading apparatus of the type in which a line sensor such as a solid state image pick-up element having the array direction thereof provided in parallelism to a secondary scanning direction in which an original is intermittently moved is moved in a primary scanning direction orthogonal to the secondary scanning direction to thereby read the image of the original.

In the reading apparatus according to the present invention, the above object is achieved by forming the illuminating system by a linear light source secured in parallelism to the secondary scanning direction, a fixed cylindrical parabolic mirror having the center of the linear light source as its focal line position and having a generating line in the secondary scanning direction, and a cylindrical scanning mirror movable in the primary scanning direction to scan the original surface and having the generating line direction thereof in the secondary scanning direction. That is, the light beam emitted from the linear light source is made into a light beam collimated in one direction by the cylindrical parabolic mirror and is directed toward the cylindrical scanning mirror. This cylindrical scanning mirror is moved in the primary scanning direction along the original surface and, of the components of the light beam from the cylindrical parabolic mirror, the parallel component is imaged on the original surface by the cylindrical scanning mirror while, at the same time, the original surface is scanned by a slit-like light beam with movement of the cylindrical scanning mirror.

In the above-described illuminating system applied to the reading apparatus of the present invention, of the light beam components which arrive at the original surface, the light beam component in the generating line direction of the cylindrical parabolic mirror and cylindrical scanning mirror is not subjected to any refracting action and therefore, of the light beam which arrives at the original surface, the light beam of the component in the secondary scanning direction is a divergent light beam. Accordingly, where the original surface is long in the primary scanning direction, it sometimes happens that the quantity of light reaching from the light source is varied by the position of the original surface in the primary scanning direction. In such cases, a reflecting plate is provided near the cylindrical scanning mirror and means for detecting the light beam from this reflecting plate is provided to detect a signal, and an electric circuit is provided for causing the detection signal to be fed back to a light source input power source to render the illumination on the original surface constant, whereby there is provided a reading apparatus capable of effecting more reading.

The invention will become more fully apparent from the following detailed description thereof taken in conjunction with the accompanying drawings.

DESCRIPTION OF THE PREFERRED EMBODIMENTS

Figure 1:
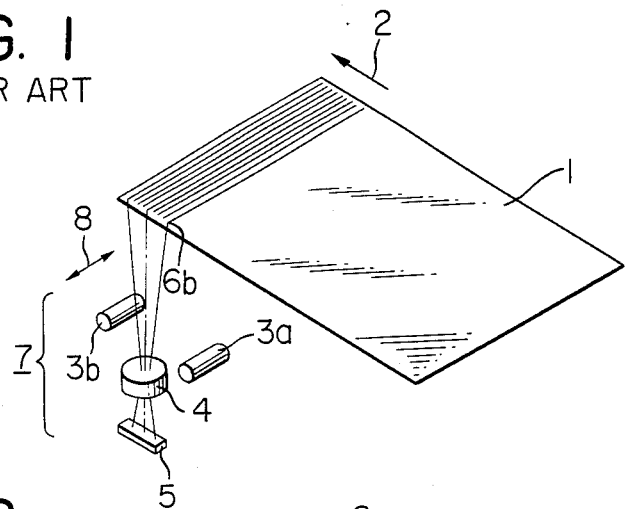
FIGS. 1 and 2 show the reading apparatus according to the prior art.
Figure 2:
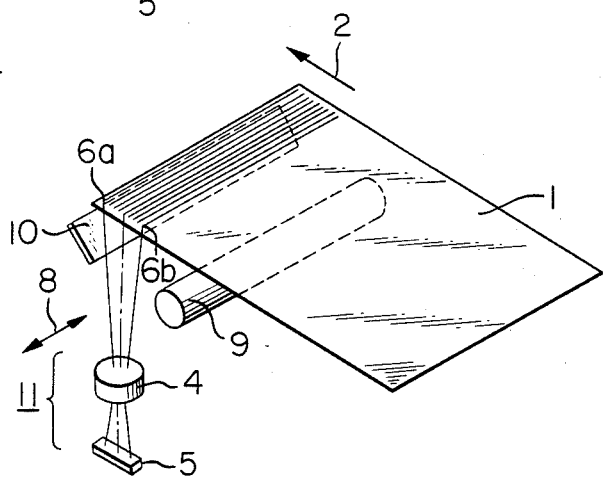
Figure 3:
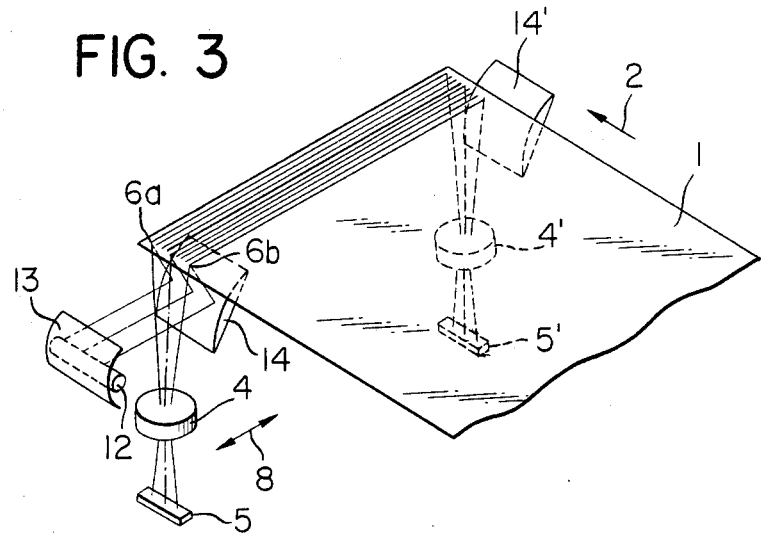
FIG. 3 shows a first embodiment of the reading apparatus according to the present invention.

FIG. 3 shows a first embodiment of the present invention.

A linear light source 12 having a sufficient length to illuminate slit width areas 6a–6b and secured in parallelism to the direction of arrow 2 (secondary scanning direction) is partly surrounded by a parabolic mirror 13 which is cylindrical with the position thereof as the focal line position, namely, which has no refractive power in the secondary scanning direction or, in other words, has a generating line in the secondary scanning direction. The light emitted from the linear light source 12 is reflected by the parabolic mirror 13, and is reflected by an in-mirror lens 14 which is moved with an imaging lens 4 and a solid state image pick-up element 5 and which is cylindrical, namely, which has no refractive power in the secondary scanning direction, and travels on the slit width areas 6a–6b while being imaged substantially linearly. A cylindrical parabolic mirror may be used instead of the cylindrical in-mirror lens 14.

Figure 4:
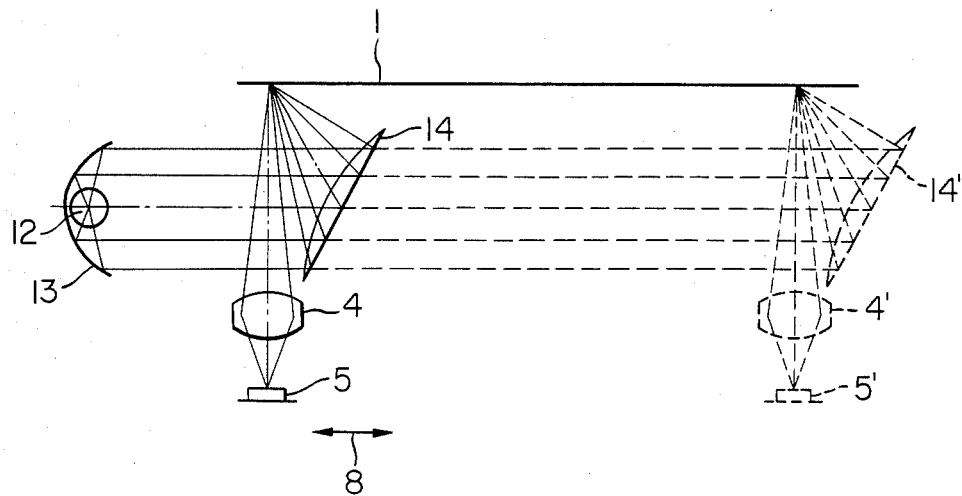
FIG. 4 is a cross-sectional view of the FIG. 3 apparatus taken in the primary scanning direction.

FIG. 4 shows the cross-section of the FIG. 3 apparatus in the primary scanning direction. The light from the linear light source 12 secured at the focal line position of the fixed cylindrical parabolic mirror 13 is reflected by the parabolic mirror 13 and made into a parallel light beam in this cross-section, and is reflected by the cylindrical in-mirror lens 14 moved in the direction of arrow 8 (primary scanning direction) and projected in a slit-like form upon an original surface 1 which is the focal line position thereof. The illuminated slit area on the original surface 1 is projected upon the solid state image pick-up element 5 by the imaging lens 4.

Figure 5:
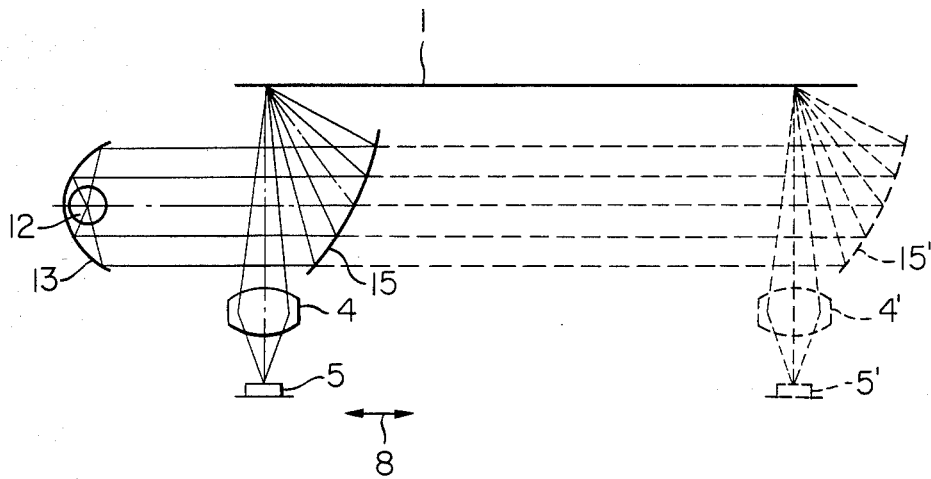
FIG. 5 is a cross-sectional view of a second embodiment of the reading apparatus according to the present invention taken in the primary scanning direction.

FIG. 5 shows a second embodiment of the reading apparatus according to the present invention, and like FIG. 4, it is a cross-sectional view in the primary scanning direction. In the apparatus shown in FIG. 5, the cylindrical in-mirror lens 14 is replaced by the cylindrical parabolic mirror. As shown in FIG. 5, the parallel light beam reflected by the fixed cylindrical parabolic mirror 13 is reflected by the cylindrical parabolic mirror 15 moved in the direction of arrow 8 (primary scanning direction) and is projected in a slit-like form upon the original surface 1 which is the focal line position thereof.

The light beam spreads in a plane perpendicular to the cross-section of FIGS. 4 and 5, namely, in the direction of the shorter side of the slit (secondary scanning direction, but since the slit width is slight, any reduction in illumination offers not so great a problem depending on the length of the scanning area. However, where the length of the scanning area in the primary scanning direction is great, namely, for an original of a large size, any reduction in illumination may lead to a problem.

Figure 6:
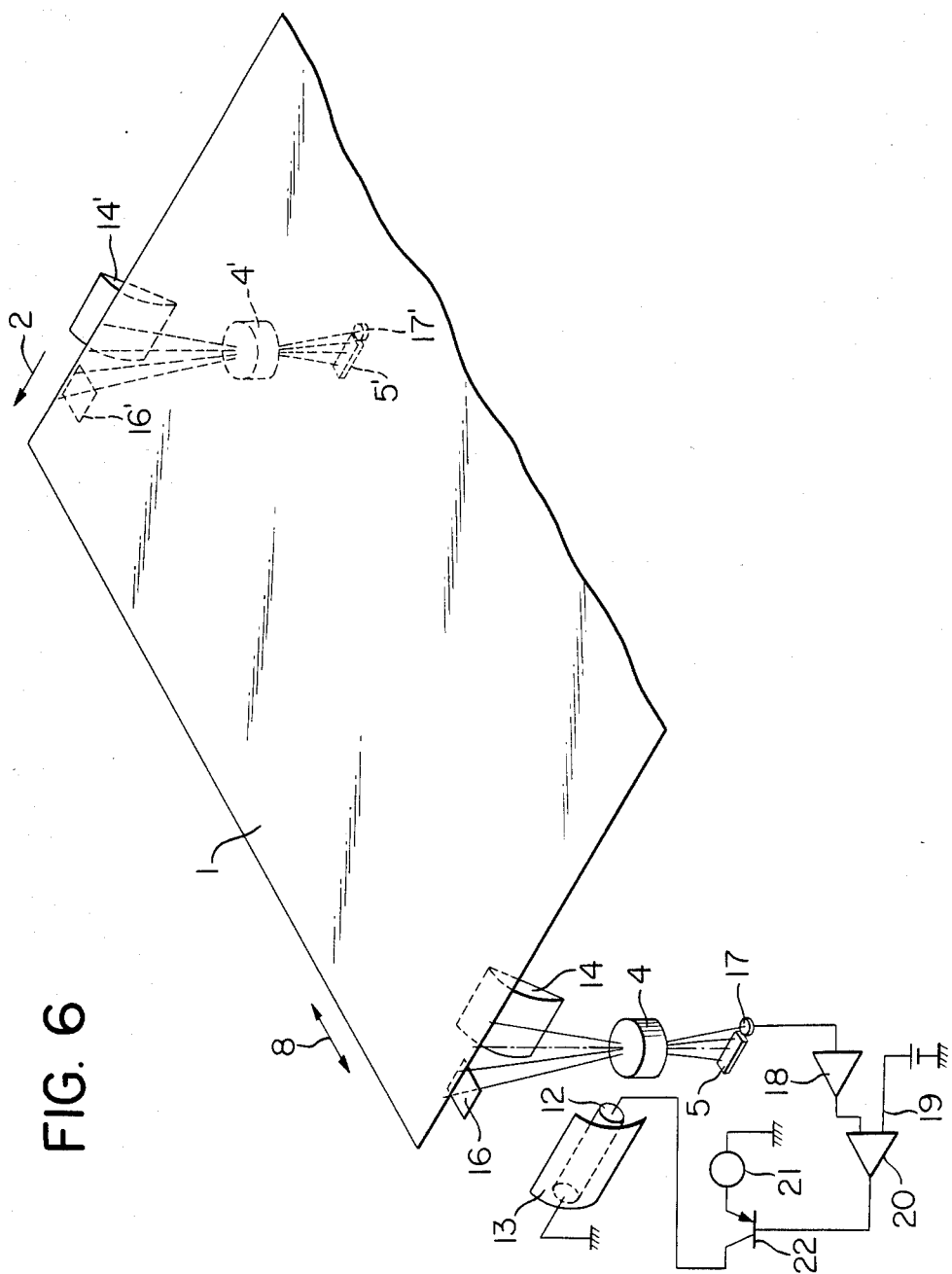
FIG. 6 shows a third embodiment of the reading apparatus according to the present invention.

FIG. 6 shows an embodiment of the reading apparatus which has overcome the difficulty of reduced illumination. As shown in FIG. 6, during the scanning in the direction of arrow 8, namely, in the primary scanning direction, a reference reflection plate 16 is provided near a cylindrical in-mirror lens 14, and a light-receiving element 17 for detecting the light reflected by the reference reflection plate through the imaging lens 4 is further provided near the solid state image pick-up element 5, and these are constructed as a part of the reading head and moved in the direction of arrow 8 (primary scanning direction) with the imaging lens 4, the solid state image pick-up element 5 and the cylindrical in-mirror lens 14. During the scanning, part of the illuminating light beam reflected by the reference reflection plate 16 is projected upon a light-receiving element 17 adjacent to the solid state image pick-up element 5 through the imaging lens 4, and the output from the light-receiving element 17 is amplified by an amplifier 18 and compared with a reference voltage 19, and fed back to the base of a transistor 22 as a control signal passed through an error amplifier 20, and the input of an applying power source 21 to the linear light source 12, namely, the applied voltage or current is controlled, whereby the illumination on the original surface can always be maintained constant during the movement in the primary scanning direction.

The reference reflection plate 16 may be a fixed reflection plate which is long in the primary scanning direction.

The light-receiving element 17 may be embedded onto the solid state image pick-up element 5.

Thus, according to the present invention, there can be provided a compact reading apparatus for use the reading of a facsimile apparatus or the like.

What we claim is:

1. An apparatus for reading an original surface by illuminating it with a slit-like light beam, comprising:
   a fixed linear light source;
   a cylindrical parabolic mirror fixedly provided so that the focal line position thereof is coincident with said linear light source, the light beam from said linear light source being directed in a predetermined direction by said parabolic mirror;

a cylindrical scanning mirror disposed so that the generating line direction thereof is coincident with the generating line direction of said cylindrical parabolic mirror, said cylindrical scanning mirror condensing the light beam from said cylindrical parabolic mirror in a slit-like form on the original surface and being movable in said predetermined direction along the original surface to thereby illuminate the entire area of the original surface; and an optical system movable in said predetermined direction with said cylindrical scanning mirror to read the light beam scattered by said original surface, said optical system comprising a line sensor array and imaging optical means for directing said scattered light to said line sensor array.

2. An apparatus for reading an original surface by illuminating it with a slit-like light beam, comprising:

a solid state image pick-up array having the array direction thereof provided in parallelism to a secondary scanning direction in which the original is intermittently moved and movable in a primary scanning direction orthogonal to said secondary scanning direction;

a cylindrical parabolic mirror having the generating line thereof secured in parallelism to said secondary scanning direction;

a linear light source secured at the focal line position of said parabolic mirror;

a cylindrical scanning mirror having the generating line thereof parallel to said secondary scanning direction and receiving the light beam from said parabolic mirror and arranged to project it in a slit-like form upon the original surface and movable in said primary scanning direction; and optical means for directing the slit light beam scattered by said original surface onto said solid state image pick-up array.

3. An apparatus according to claim 2, wherein said cylindrical scanning mirror is an in-mirror lens.

4. An apparatus according to claim 2, wherein said cylindrical scanning mirror is a cylindrical parabolic mirror.

5. An apparatus for reading an original surface by illuminating it with a slit-like light beam, comprising:

a solid state image pick-up array having the array direction thereof provided in parallelism to a secondary scanning direction in which the original is intermittently moved and movable in a primary scanning direction orthogonal to said secondary scanning direction;

a cylindrical parabolic mirror secured in parallelism to said secondary scanning direction;

a linear light source secured at the focal line position of said parabolic mirror;

a cylindrical scanning mirror having the generating line thereof parallel to said secondary scanning direction and receiving the light beam from said parabolic mirror and arranged to project it in a slit-like form on the original surface and movable in said primary scanning direction;

optical means for directing the light beam scattered by said original surface to said solid state image pick-up array;

light-receiving means for receiving part of the light beam from said cylindrical scanning mirror; and control means for controlling a voltage applied to said linear light source by the output signal from said light-receiving means.

6. An apparatus according to claim 5, wherein said light-receiving means comprises a reflecting mirror for reflecting the light beam from said cylindrical scanning mirror and a light-receiving element for receiving the light beam from said reflecting mirror.

7. An apparatus according to claim 5, wherein said cylindrical scanning mirror is an in-mirror lens.

8. An apparatus according to claim 5, wherein said cylindrical scanning mirror is a cylindrical parabolic mirror.

* * * * *